United States Patent
Botteck

(10) Patent No.: US 6,928,264 B2
(45) Date of Patent: Aug. 9, 2005

(54) METHOD AND DEVICE FOR THE DISTRIBUTED EXECUTION OF TASKS BY MEANS OF A PERSONAL DIGITAL MOBILE DEVICE IN A LOW POWER RADIO NETWORK

(75) Inventor: Martin Botteck, Dortmund (DE)

(73) Assignee: Nokia Corporation, Espoo (FI)

( * ) Notice: Subject to any disclaimer, the term of this patent is extended or adjusted under 35 U.S.C. 154(b) by 549 days.

(21) Appl. No.: 09/955,167

(22) Filed: Sep. 19, 2001

(65) Prior Publication Data

US 2003/0054765 A1 Mar. 20, 2003

(51) Int. Cl.⁷ ............................................... H04B 7/00
(52) U.S. Cl. .................. 455/41.2; 455/41.3; 455/556.1; 455/556.2
(58) Field of Search .............................. 455/41.1, 41.2, 455/41.3, 556.1, 556.2, 517, 500, 550.1

(56) References Cited

U.S. PATENT DOCUMENTS 5,603,054 A    2/1997  Theimer et al.

2002/0032746 A1    3/2002  Lazaridis

FOREIGN PATENT DOCUMENTS

| EP | 1024628 | 8/2000 | |
|---|---|---|---|
| EP | 1146467 | 10/2001 | |
| EP | 1170920 | 1/2002 | |
| WO | 9917566 | 4/1999 | |
| WO | WO 00/51293 | * 8/2000 | ........... H04L/12/26 |
| WO | 0133901 | 5/2001 | |

* cited by examiner

Primary Examiner—Melur Ramakrishnaiah
(74) Attorney, Agent, or Firm—Antonelli, Terry, Stout & Kraus, LLP

(57) ABSTRACT

A method and device for the distributed execution of tasks by means of a personal digital mobile device in a low power radio network. The invention utilizes a personal digital mobile device (PDMD), to store tasks until conditions are detected in which the task can be executed. In a first step a task to be executed is generated in the PDMD or transferred to the PDMD. What kind of task is generated or transferred is not important. The task is then stored in a memory in the PDMD. Then the PDMD checks all the devices it can access via LPRN, if they are able to execute the task. If such a device is found, the task will be transferred to that device for execution. The LPRN may be Bluetooth, WLAN, or something similar.

57 Claims, 1 Drawing Sheet

METHOD AND DEVICE FOR THE DISTRIBUTED EXECUTION OF TASKS BY MEANS OF A PERSONAL DIGITAL MOBILE DEVICE IN A LOW POWER RADIO NETWORK

BACKGROUND OF THE INVENTION

The present invention relates to electrical devices fitted with a low power radio transceiver like, personal digital mobile devices, user interfaces (UI) of phones, personal digital assistants (PDAs) and computers. The present invention relates to a method and apparatus for the exchange of objects (screen objects, files, data blocks, . . . ) between devices that are connected via short range radio. It also relates to the distributed execution of tasks in distributed wireless networks.

Conventional local area networks (LAN) require a hardware connection for the transmission of tasks between the two devices. The installation of the hardware is expensive, and the hardware is limited and requires maintenance. Devices not connected to the LAN cannot execute tasks from devices connected to the LAN. Standard computer applications use the copy and paste function to transfer objects to a clipboard and fetch them from the clipboard for other applications. With a wired connection, e.g., between computer and printer it is always evident if a printing task is present or not, and which printer is to execute the task. In computer networks it is possible to select a certain printer to execute the task, e.g., from a menu.

Conventional wireless local area network (WLAN) applications, require at least a chain of overlapping radio links to successively transfer a task from one device to another. If there are no overlapping radio ranges, the missing link of a WLAN connection between two devices has to be compensated by a wired bus connection or the like. The WLAN is not a fixed structure in which every device has a fixed location, so it can happen that a chain of overlapping radio links breaks down if a device of the chain is moved out of the radio range. If the WLAN is distributed, e.g., if most of the devices in the WLAN cannot directly connect to most of the other devices, the information overhead necessary for transmissions between two remote devices increases, and the data transfer rate decreases. The transfer of data or tasks in distributed WLANs, or to other LANs or WLANs is difficult and requires multiple user interaction.

Additionally, in WLANs the devices are not necessarily connected by hardware, as is the case with mobile devices like mobile phones, laptop computers, organizers, etc. which are not adapted to communicate with multiple other devices like printers and so on. Actually, the user cannot determine if he is in proximity of a device able to execute a task waiting in his personal device.

SUMMARY OF THE INVENTION

Therefore, a method for executing tasks in a low power radio network is required, that reduces the number of necessary user interactions to execute a task in a distributed low power radio network.

The object of the present invention is to overcome the above cited problems of conventional WLANs and to provide a method to execute tasks in distributed WLANs with a minimum of user interactions required.

Another object of the invention is to provide a method to execute tasks in a distributed low power radio network between devices with no direct stable radio connection.

According to a first aspect of the present invention, a method for distributed execution of tasks in a low power radio network (LPRN) is provided. The method utilizes a personal digital mobile device (PDMD), to store tasks until conditions are detected in which the task can be executed. In a first step a task to be executed is generated in the PDMD. The kind of task is not important. The task can be a text to be printed, a request, an optimization task (like route planning or like), a storage task, a computation task and so on. The task is then stored in the PDMD. Then a link between the PDMD and the LPRN is established to find a match of the task stored in PDMDs and the tasks executable by a device. If such a match is found, the task will be transferred from the PDMD to that device for execution. The LPRN may be Bluetooth, WLAN, or something similar.

Preferably, the PDMD establishes the link between the PDMD and the LPRN by broadcasting task related information. So in this embodiment the PDMD is scanning its environment actively, searching for devices, to get their stored tasks to be executed. It is like a customer walking from store to store to get his necessities.

Advantageously, the device able to execute a task establishes the link between the PDMD and the LPRN by broadcasting information related to its ability to execute tasks. So in this embodiment the device able to execute a task is scanning its environment actively, searching for PDMDs, to get stored tasks to be executed. This can be done e.g. by periodically transmitting a signal or a message containing information about the capabilities of the device. The broadcasting can also be started by user interaction at the device, e.g. that a printer starts to scan devices in the neighborhood only when a user presses a button on the device. It is like a barker offering his service on the market.

The tasks and the task related information may be stored in a single output buffer. The detection of the match between the tasks stored in the PDMD and the abilities of devices may be simplified by storing the tasks and task related information in different output buffers. Another benefit of two output buffers is that the content of the task related information output buffer may be polled without any restrictions. The task related information can be stored as a code, e.g. 023 for printing. If a mach is found the device may request the execution of the task from the PDMD, or may directly poll the task from the second output buffer. Preferably, the step of generating a task is executed by transferring a task from a first device to the PDMD via said LPRN.

The first device and the PDMD may be integrated in the same unit. Nonetheless, the user interface will benefit from the necessity of less key clicks since the PDMD does not need to be hooked up to a network already before the task is created, all necessary network or radio link connections, if so required, can be established after de device intended to execute the assigned task comes within range. Furthermore, selection of the device intended to execute the task does not need to be done by browsing through extensive lists of devices (it can safely be assumed that there will be plenty of them around once wireless communication technologies become a commodity affair) but by merely approaching said device and activating it by way of the "place" (see below) function.

The PDMD serves as a task queue for the first device, and therefore can compensate temporal or transmission problems. In the simplest case, the PDMD waits till it detects a device in the proximity or close neighborhood which is ready to execute a task. The PDMD is able to be carried around, as it is a mobile device, and it can communicate with the other devices within the range of its radio transceiver. The user can transfer, e.g., a high quality printing task from a computer to a PDMD. The PDMD detects that the standard printer within the local range of the LPRN, cannot execute that task because of too less colors or poor resolution of the printer. The user then can carry this task stored in the PDMD, e.g., to a print shop for executing the task. The advantage with respect to standard data transfer methods is that the user does not have to care about, e.g., the storage medium, the eventually necessary data compression methods, and so on. As long as the print store has a radio interface, the task and data can be transmitted. Tasks and respective data can be carried around until they can be transferred to a device to be executed.

The invention simplifies the use of a PDMD. There are less clicks to be made in order to actually transfer wanted data through a local radio link. It renders the necessity to manually established connections superfluous to the user before he/she can transfer the wanted data.

The task can be to transfer some data from his device to another one close by, e.g. to print an address from an address book. The task can also be to print, store, mail, delete, request information, calculate, compute, or phone. Another application is a transaction such as the purchase of e.g. a railroad ticket or the like. So, if a user wants to travel by train, he enters a destination into the PDMD, and a ticket machine at the station reads the information automatically. Then the ticket machine can return an electronic ticket, or print a ticket.

The actual embodiment of the PDMD is not important. The user can pick a task using a pointing device (e.g. touch screen with velocity sensor, special mouse button, or something similar) Then the selected data is kept in a temporary buffer and the device goes to a state where it is ready to send out this data for further interaction of the user.

The user after that "places" the previously "picked" data by enacting a "place" function on the target device. Again, this function can be invoked by using touch screen with velocity function, one of the mouse buttons or similar.

Upon this "place" function being invoked the target device starts to scan the neighborhood for devices that have some data waiting to be sent out. Upon such device being detected a message might be displayed identifying the sending device and the data is transferred (e.g. into this devices address book).

Conveniently, the PDMD determines if its stored information is to be transferred to said detected device. This can be executed e.g. by a user input to enable the transfer from the PDMD to the detected device. This is especially important if the link initiated by the device able to execute a task, to prevent that any device can poll tasks, or data from the PDMD. So the method can further comprise a step of displaying status information of said device able to execute the task, and waiting for a user input for transmission or break off, between the steps of checking and transmitting. This additional input provides safety to the user and to the user's data. The user input is a confirmation for the execution of a task. This is especially important if the task is connected with payment transactions or is used for private data.

The safety of the transactions can secondly be provided by confirmation: The device putting the data into the playout buffer displays a message indicating the device name now asking for the data and requires confirmation to proceed from the user.

The user can predefine which device can automatically execute which tasks, and which tasks or devices require an additional confirmation. With that e.g., the printer in the office or bureau is always authorized to execute printing tasks, and in the case of unknown devices the user is asked to confirm the execution of the task by the device.

Advantageously, the communication between the PDMD and other devices comprises an authentication operation between the PDMD and the device. With an authentication the PDMD can automatically decide if a task can be transmitted to a device or not, skipping a user input.

Preferably the safety of the transactions can first be assured by bonding of devices: The device putting the data into the playout buffer (thus acting as like the PDMD) allows to retrieve the data only by devices that are already bonded. Bonding can be done, e.g., by exchanging link keys derived from Bluetooth identifiers (IDs).

According to the method of the present invention part of the transfers between said PDMD and the detected device are encrypted. The above described link keys can serve to authenticate the devices to each other and also encrypt the data traffic between them. Other keys than Bluetooth specific link keys may also be used as suitable for the specifics of the LPRN type actually used. Preferably, the method is only used to detect a device able to execute a certain task, and the actual data transfer is executed, e.g., by inserting the PDMD into a metal box to prevent eavesdropping of personal data by other devices. Eavesdropping can be prevented by the use of a wired connection or encryption which often is much safer.

Preferably, the method further comprises the step of transmitting a confirmation from the device that received the task to the personal digital mobile device (PDMD). The confirmation can comprise a simple receive confirmation. The confirmation can comprise an estimation on how long it takes to execute the task. This is especially useful if the user carrying the PDMD is moving, and might leave the range of the LPRN. The confirmation can comprise execution related information like costs transfer rates, locations and the like. As the task can be an offer or a request for a transaction, the reply can be e.g., a special price offer. The confirmation can comprises the retransmission of a result of the task. This is especially useful if the task is a computation task or a data request.

Preferably, the confirmation will be displayed on the personal digital mobile device (PDMD). The display content can be a confirmation or a result. The display can be an optical or an acoustical display. The task can be, e.g., to access an acoustical file, and the displaying of the result can be to play the acoustical file. The device may simultaneously survey the link quality, to prevent that the user leaves the range of the low power radio connection during transmission.

Preferably, the method further comprises the steps of displaying status information of said device able to execute said task, and waiting for a user input for continuing or interrupting the execution of a task. The option to continue, interrupt, or terminate the execution of a task can be utilised if the user has to leave the range of the LPRN. So the user can indicate if the task should be executed even in the absence of the user, or if the task should be terminated, as the user could not receive the result of the task.

Conveniently, the personal digital mobile device (PDMD) is allowed to physically move during the execution of the method. So the device and the tasks leave the range of one low power radio device and can enter the range on another low power radio device. The PDMD can access more and different devices during the transfer, virtually expanding the range of the low power radio transceiver.

The fact that the device is moving offers a lot of different options and applications. The user may use an "information kiosk", in which the task is to find a trader offering an article at a certain price. So the user enters at least one article and price and optional other article related information into the PDMD. As soon as the user approaches a shop with a respective offer, the user will be informed via the low power radio connection. Vice versa, dealers may transfer offers to the PDMD within the range of the low power radio link.

Furthermore the device having pulled the data from the sending device could process these data in a way that the result is passed further on. Like e.g. a handset sends a file for printing to a print server, where there is a printer queue and the printer drivers, from where the processed data is sent to a printer, or a data base residing on a larger computer e.g. containing access information. All data necessary for personal identification can then be put together on the PDMD (name, access location etc) the access node retrieves it, generates a ticket and issues readily to the PDMD. The PDMD can pick the calculated "ticket" when appropriate and still in range. Further access can be done by the user shifting the ticket into a playout buffer. When entering the local area or range of access node, the ticket is automatically retrieved.

There are also means provided to determine inside the data set communicated if a response as consequence of the processed data is to be sent somewhere, and where. It can be done by way of the WEB (http, ECMAscript, CGI script), known methods, such as those of WAP (WML, WMLscript) or Java or specific plugins to browsers or proprietary new methods.

According to another aspect of the present invention a method for the distributed execution of tasks by means of a personal digital mobile device (PDMD) in a low power radio network (LPRN), is provided. The method corresponds to the above described method, except that the device able to execute said task is periodically checking the LPRN for PDMDs with executable tasks.

Vice versa, to the above described methods, the devices capable of executing a task can initiate the transfer of data, or tasks. The main advantage is that the PDMD operates primarily in a low power consuming receiving mode. An object like a data file or the like can be sent to a temporary buffer of a device with a low power radio interface on user request. Another device with a low power radio interface then is activated and looks for objects in temporary buffers in the neighborhood for processing, e.g., for document printing: When a printer is activated it scans the neighborhood for devices which have an object waiting to be processed, fetches the document and prints it.

According to another aspect of the present invention a computer program for executing tasks by means of a personal digital mobile device (PDMD) in a low power radio network (LPRN) is provided, that comprises program code means for carrying out the steps of aforementioned methods when the program is run on a personal digital mobile device, a computer or a network device.

It is to be understood that due to the distributed nature of the method including different devices, the expression "computer program" includes different possible distributed computer programs for different computing means necessary for executing the method.

According to an additional aspect, the present invention provides a computer program product comprising program code means stored on a computer readable medium for carrying out the aforementioned methods when program product is run on a personal digital mobile device, a computer or network device.

According to another additional aspect of the present invention a personal digital mobile device (PDMD) is provided, that comprises a low power radio transceiver, storage means, displaying means, computing means, and detection means. The device requires the low power radio transceiver to receive and transmit tasks from other devices, the storage means, to store said tasks. Alternatively, the PDMD can comprise two storage means, for storing the tasks and task related information separately. The displaying means serve, to display status information of devices or tasks, the computing means and detection means serve, to detect the location of other transceivers. The detection means can be a radio frequency amplitude tracking device, able to tell the user if he is approaching a radio source, e.g. by monitoring the link quality. The amplitude tracking device can be combined with a directional sensitive antenna, to indicate a direction to the radio transmitter. The detection means can be a phased array antenna, to indicate the position of the device in two dimensions. The PDMD with the detection means can be incorporated in other personal mobile devices such as mobile phones, palmtop computers, communicators, personal digital assistants (PDAs) and the like.

This is useful, e.g., in the case of the automatic ticket printing task. So the user can easily detect that ticket machine that is actually printing his ticket. The detection means can be used to support a short range navigation option to simplify the search for a certain device. If this option is implemented, e.g., in a mobile phone with a low power radio interface, the task can be "locate mobile phone #####". If the mobile phone with the telephone number ##### is equipped with a low power radio interface too, the mobile phone can be used to locate a single person or device even in crowded places.

BRIEF DESCRIPTION OF THE DRAWINGS

In the following the invention is described by way of example with reference to the attached drawing, in which.

DETAILED DESCRIPTION OF THE INVENTION

Figure 1:
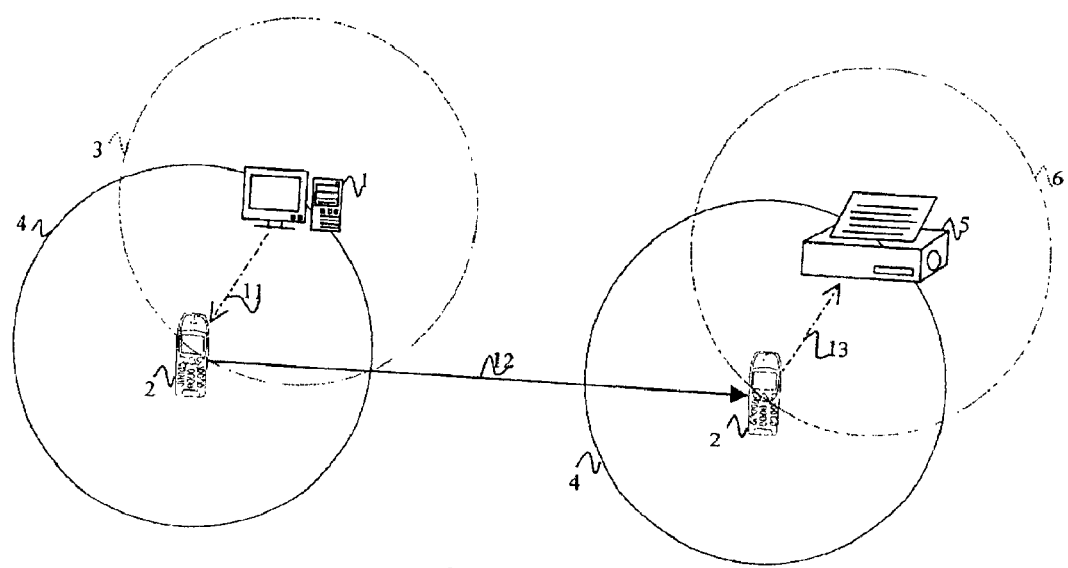
FIG. 1 depicts an embodiment of the present invention, used to execute a printing task.

FIG. 1 describes one of the simplest ways to execute the method of the present invention. The personal digital mobile device (PDMD) 2 receives, e.g., a print task from a computer 1 via a low power radio network (LPRN) link 11. This is possible because the computer 1 is in the radio transmission local area or range 4 of the PDMD 2, and the PDMD 2 is in the radio transmission range 3 of the computer 1. The LPRN is a low power radio network like WLAN (Wireless Local Area Network), Bluetooth™ or the like. The PDMD 2 is a computing device with a display, a memory and a radio transceiver. In the Figure, the PDMD 2 is integrated in a mobile telephone. The PDMD stores the task in an internal memory. With the present invention, the task can be executed immediately, if the PDMD 5 can detect a device able to execute the task immediately (not shown). The PDMD 2 cannot execute the print task, and cannot transfer the task to a printer 5 because the printer 5 is actually out of range.

Next a user (not shown) carries 12 the PDMD 2 into the low power radio transmission range 6 of a printer 5. During the transport 12 the PDMD 2 periodically checks the radio frequencies for devices the PDMD 2 can communicate with. If the PDMD 2 detects the printer 5, it starts to communicate with the printer 5 to detect if the printer 5 can execute the printing task. The PDMD 2 requests via LPRN 13 the abilities of the printer 5. If the printer 5 is able to execute the printing task stored in the PDMD 2, the task is transmitted to the printer 5 via the LPRN 13 automatically, and the task is executed automatically on the printer 5. If the printer 5 is not able to execute the printing task, e.g., due to a lack of colors, the task will not be transmitted, and the PDMD 2 waits for the detection of another device able to execute the task.

In a conventional WLAN application, there would be required some devices with overlapping radio link ranges to successively transfer the printing task to the printer 5. In the depicted situation, the printing task could not be executed, because of the missing WLAN connection between the computer 1 and the printer 5.

The PDMD 2 can store tasks and execute them if being transported into the range of a device able to execute the task. It is like a situation of storing a file on a floppy disc, carrying it to the printer, and printing it on the printer. The difference is, that the PDMD 2 can execute all these actions automatically. So if the user leaves the radio range of one device and enters the radio range of an other device the execution of the task can be started automatically without any user input. The difference with respect to normal WLAN is, that the invention does not need a direct or indirect WLAN connection from the computer 1 to the printer 5 to print a document.

What is claimed is:

1. A method for the distributed execution of tasks by means of a personal digital mobile device (PDMD) in a low power radio network (LPRN), comprising the steps of:
   generating a task in said PDMD;
   storing the task in said PDMD;
   establishing a link between said PDMD and said LPRN to detect a match of the task stored in PDMDs and the tasks executable by a device;
   transferring said task stored in said PDMD to a device able to execute said task, if the ability to execute a task which matches the task stored in the PDMD is detected; and
   executing said task in said device able to execute said task,
   wherein said task is generated in said PDMD by transferring the task from a first device in the local range of said LPRN to said PDMD via said LPRN.

2. A method according to claim 1, wherein said link is established by said PDMD by broadcasting task related information.

3. A method according to claim 2, further comprising the step of physically moving said PDMD.

4. A method according to claim 2, further comprising the step of determining if said task stored in said PDMD is to be transferred to said device able to execute said task.

5. A method according to claim 2, further comprising the step of transmitting a confirmation from said device executing said task to said PDMD.

6. A method according to claim 2, further comprising the steps of displaying status information of said device able to execute said task, and waiting for a user input for continuing or breaking off.

7. A method according to claim 2, further comprising the steps of displaying status information of said device able to execute said task, and waiting for a user input for continuing or breaking off.

8. A method according to claim 2, further comprising the step of physically moving said PDMD.

9. A method according to claim 2, further comprising the step of determining if said task stored in said PDMD is to be transferred to said device able to execute said task.

10. A method according to claim 9, further comprising the step of transmitting a confirmation from said device executing said task to said PDMD.

11. A method according to claim 3, further comprising the steps of displaying status information of said device able to execute said task, and waiting for a user input for continuing or breaking off.

12. A method according to claim 3, further comprising the step of physically moving said PDMD.

13. A method according to claim 9, wherein said determination step comprises an authentication operation between the PDMD and said device able to execute said task.

14. A method according to claim 13, further comprising the step of transmitting a confirmation from said device executing said task to said PDMD.

15. A method according to claim 13, further comprising the steps of displaying status information of said device able to execute said task, and waiting for a user input for continuing or breaking off.

16. A method according to claim 13, further comprising the step of physically moving said PDMD.

17. A method according to claim 13, wherein said authentication operation is performed by bonding.

18. A method according to claim 17, further comprising the step of transmitting a confirmation from said device executing said task to said PDMD.

19. A method according to claim 17, further comprising the steps of displaying status information of said device able to execute said task, and waiting for a user input for continuing or breaking off.

20. A method according to claim 17, further comprising the step of physically moving said PDMD.

21. A method according to claim 17, wherein at least a part of the transfers between said PDMD and the device able to execute said task are encrypted.

22. A method according to claim 21, further comprising the step of transmitting a confirmation from said device executing said task to said PDMD.

23. A method according to claim 21, further comprising the steps of displaying status information of said device able to execute said task, and waiting for a user input for continuing or breaking off.

24. A method according to claim 21, further comprising the step of physically moving said PDMD.

25. A method according to claim 2, further comprising the step of transmitting a confirmation from said device executing said task to said PDMD.

26. A method according to claim 25, further comprising the steps of displaying status information of said device able to execute said task, and waiting for a user input for continuing or breaking off.

27. A method according to claim 25, further comprising the step of physically moving said PDMD.

28. A method according to claim 25, wherein said confirmation comprises a result of the task.

29. A method according to claim 28, further comprising the step of:
   displaying said confirmation on said PDMD.

30. A method according to claim 28, further comprising the steps of displaying status information of said device able to execute said task, and waiting for a user input for continuing or breaking off.

31. A method according to claim 28, further comprising the step of physically moving said PDMD.

32. A method according to claim 25, further comprising the step of:
displaying said confirmation on said PDMD.

33. A method according to claim 32, further comprising the steps of displaying status information of said device able to execute said task, and waiting for a user input for continuing or breaking off.

34. A method according to claim 32, further comprising the step of physically moving said PDMD.

35. A method according to claim 1, wherein said link is established by said devices able to execute tasks by broadcasting information related to their ability to execute tasks.

36. A method according to claim 35, further comprising the step of determining if said task stored in said PDMD is to be transferred to said device able to execute said task.

37. A method according to claim 35, further comprising the step of transmitting a confirmation from said device executing said task to said PDMD.

38. A method according to claim 35, further comprising the steps of displaying status information of said device able to execute said task, and waiting for a user input for continuing or breaking off.

39. A method according to claim 35, further comprising the step of physically moving said PDMD.

40. A method according to claim 1, further comprising the steps of displaying status information of said device able to execute said task, and waiting for a user input for continuing or breaking off.

41. A method according to claim 40, further comprising the steps of displaying status information of said device able to execute said task, and waiting for a user input for continuing or breaking off.

42. A method according to claim 40, further comprising the step of physically moving said PDMD.

43. An apparatus comprising a storage medium with a computer program stored therein for executing tasks by means of a personal digital mobile device (PDMD) in a low power radio network (LPRN), the computer program when executed on a personal digital mobile device, a computer or a network device, performing:
generating a task in said PDMD;
storing the task in said PDMD;
establishing a link between said PDMD and said LPRN to detect a match of the task stored in PDMDs and the tasks executable by a device;
determining if said task stored in said PDMD is to be transferred to said device able to execute said task;
transferring said task stored in said PDMD to a device able to execute said task, if the ability to execute a task which matches the task stored in the PDMD is detected; and
executing said task in said device capable of executing said task,
wherein said task is generated in said PDMD by transferring the task from a first device in the local range of said LPRN to said PDMD via said LPRN.

44. An apparatus according to claim 43, the computer program when executed further causing a personal digital mobile device, a computer or a network device to perform establishing said link by said PDMD by broadcasting task related information.

45. An apparatus according to claim 44, the computer program when executed further causing a personal digital mobile device, a computer or a network device to perform determining if said task stored in said PDMD is to be transferred to said device able to execute said task.

46. An apparatus according to claim 45, wherein said determining comprises an authentication operation between the PDMD and said device able to execute said task.

47. An apparatus according to claim 46, wherein said authentication operation is performed by bonding.

48. An apparatus according to claim 47, wherein at least a part of the transfers between said PDMD and the device able to execute said task are encrypted.

49. An apparatus according to claim 44, the computer program when executed further causing a personal digital mobile device, a computer or a network device to perform transmitting a confirmation from said device executing said task to said PDMD.

50. An apparatus according to claim 49, wherein said confirmation comprises a result of the task.

51. An apparatus according to claim 49, the computer program when executed further causing a personal digital mobile device, a computer or a network device to perform displaying said confirmation on said PDMD.

52. An apparatus according to claim 44, the computer program when executed further causing a personal digital mobile device, a computer or a network device to perform physically moving said PDMD.

53. An apparatus according to claim 43, the computer program when executed further causing a personal digital mobile device, a computer or a network device to perform establishing said link by said devices able to execute tasks by broadcasting information related to their ability to execute tasks.

54. An apparatus according to claim 43, the computer program when executed further causing a personal digital mobile device, a computer or a network device to perform displaying status information of said device able to execute said task, and waiting for a user input for continuing or breaking off.

55. A personal digital mobile device, comprising:
low power radio transceiver to receive and transmit tasks from devices in a local range of a low power radio network;
storage means to store said tasks;
displaying means, to display status information of the device or the task;
computing means; and
detection means, to detect the location of other transceivers;
wherein the tasks are generated in the personal digital mobile device by receiving the tasks transferred from a first device in the local range of the low power radio network to the personal digital mobile device via the low power radio network.

56. A method for the distributed execution of tasks by means of a personal digital mobile device (PDMD) in a low power radio network (LPRN), comprising the steps of:
generating a task in said PDMD;
storing the task in said PDMD;
establishing a link between said PDMD and said LPRN to detect a match of the task stored in PDMDs and the tasks executable by a device;
transferring said task stored in said PDMD to a device able to execute said task, if the ability to execute a task which matches the task stored in the PDMD is detected; and executing said task in said device able to execute said task, wherein said task is generated in said PDMD after receiving a second task by said PDMD transferred from a first device in the local range of said LPRN via a network different than said LPRN.

57. A method for the distributed execution of tasks by means of a personal digital mobile device (PDMD) in a low power radio network (LPRN), comprising the steps of:

receiving a task transferred from a first device in the local range of said LPRN by said PDMD;

generating a second task in said PDMD, the second task being related to the received task;

storing the second task in said PDMD;

establishing a link between said PDMD and said LPRN to detect a match of the second task stored in PDMDs and the tasks executable by a device;

transferring said second task stored in said PDMD to a device able to execute said second task, if the ability to execute a task which matches the second task stored in the PDMD is detected; and executing said second task in said device able to execute said second task, wherein said second task is transferred by said PDMD and executed by said device automatically.

* * * * *